(12) United States Patent
Rao et al.

(10) Patent No.: US 11,924,754 B2
(45) Date of Patent: *Mar. 5, 2024

(54) ENERGY-EFFICIENT BASE STATION WITH SYNCHRONIZATION

(71) Applicant: Parallel Wireless, Inc., Nashua, NH (US)

(72) Inventors: Prashanth Rao, Wilmington, MA (US); Steven Paul Papa, Windham, NH (US); Christopher Simmonds, Andover, MA (US); Ramesh Annavajjala, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,842

(22) Filed: Apr. 29, 2022

(65) Prior Publication Data

US 2022/0256456 A1 Aug. 11, 2022

Related U.S. Application Data

(63) Continuation of application No. 16/813,244, filed on Mar. 9, 2020, now Pat. No. 11,323,961.
(Continued)

(51) Int. Cl.
*H04W 52/02* (2009.01)
*H04B 7/06* (2006.01)
(Continued)

(52) U.S. Cl.
CPC ...... *H04W 52/0206* (2013.01); *H04B 7/0693* (2013.01); *H04W 16/28* (2013.01);
(Continued)

(58) Field of Classification Search
CPC . H04W 52/0206; H04W 16/28; H04W 24/02; H04W 24/08; H04W 36/04; H04W 36/22; H04W 48/12; H04B 7/0693
See application file for complete search history.

(56) References Cited

U.S. PATENT DOCUMENTS

| 11,323,961 B2 * | 5/2022 | Rao | H04W 24/02 |
| 2013/0064157 A1 * | 3/2013 | Lindgren | H04W 52/0216 370/311 |

(Continued)

FOREIGN PATENT DOCUMENTS

GB 2469800 A * 3/2010 ........... H04W 76/04

*Primary Examiner* — Brandon J Miller
(74) *Attorney, Agent, or Firm* — Michael Y. Saji

(57) ABSTRACT

Systems, methods and computer software are disclosed for providing an energy efficient base station with synchronization. In one embodiment, a method is disclosed, comprising: performing traffic analysis to determine off-peak hours duration when traffic is light; updating downlink and uplink schedulers to transmit a minimum required signaling and control information; and wherein updating downlink and uplink scheduler for minimum required signaling and control information further comprises scheduling, in a downlink direction, at least one of transmitting only reference symbols over selected OFDM symbols, PDCCH on up to a first three OFDM symbols, PSS and SSS on a central six PRB s and PBCH.

20 Claims, 16 Drawing Sheets

Related U.S. Application Data

(60) Provisional application No. 62/816,027, filed on Mar. 8, 2019.

(51) Int. Cl.
*H04W 16/28* (2009.01)
*H04W 24/02* (2009.01)
*H04W 24/08* (2009.01)
*H04W 36/04* (2009.01)

(52) U.S. Cl.
CPC ............ *H04W 24/02* (2013.01); *H04W 24/08* (2013.01); *H04W 36/04* (2013.01)

(56) References Cited

U.S. PATENT DOCUMENTS

| | | | |
|---|---|---|---|
| 2013/0188533 A1* | 7/2013 | He | H04L 5/0044 370/280 |
| 2017/0164375 A1* | 6/2017 | Sundararajan | H04W 72/541 |
| 2017/0181182 A1* | 6/2017 | Patel | H04L 5/0048 |

\* cited by examiner

FIGURE 13 RANDOM ACCESS PREAMBLE TRANSMISSION.

ENERGY-EFFICIENT BASE STATION WITH SYNCHRONIZATION

CROSS-REFERENCE TO RELATED APPLICATIONS

This application is a continuation of U.S. application Ser. No. 16/813,244, filed Mar. 9, 2020, which claims priority under 35 U.S.C. § 119(e) to U.S. Provisional Pat. App. No. 62/816,027, filed Mar. 8, 2019, titled "Energy-Efficient Base Station with Synchronization", each of which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

The downlink physical layer of LTE is based on orthogonal frequency-division multiple access (OFDMA) and offers following benefits: long symbol time and guard interval increases robustness to multipath and limits intersymbol interference; eliminates the need for intracell interference cancellation; allows flexible utilization of frequency spectrum; increases spectral efficiency due to orthogonality between sub-carriers; allows optimization of data rates for all users in a cell by transmitting on the best (i.e. non-faded) subcarriers for each user; data traffic, control channels that carry information on the network and cell, and reference symbols that assist in propagation channel response can be interspersed. The uplink physical layer of LTE is based on single carrier frequency division multiple access (SC-FDMA).

A UE (user equipment) or other mobile device that attaches to a nearby cell will obtain a primary sync signal and a secondary sync signal from the cell, which together enable the UE to calculate a physical cell identity (PCI). There are 504 different combinations available for the PCI, based on characteristics of the primary and secondary sync signals. A mobile network may include more than 504 cells, but this is typically handled by ensuring that the same PCI is not used for adjacent cells.

SUMMARY

Long Term Evolution (LTE) physical layer uses Orthogonal Frequency Division Multiplex (OFDM) for high peak transmission rate (100 Mbps Downlink/50 Mbps Uplink). In addition, LTE network uses multiple antenna techniques such as MIMO (Multiple Input Multiple Output) to increase capacity or enhance signal robustness. However, this benefits are not without drawbacks, such as, increased power consumption at the base station due to the need of use of power amplifiers.

Therefore, there is a need for energy efficient base station. Methods of providing energy-efficient base station are disclosed using reconfiguring the uplink and downlink scheduler at the eNodeB, in both time and frequency domains, to selectively turn on and off the key power consuming building blocks to improve the efficiency. The disclosed methods may improve the efficiency by a factor of 10 to 20.

System, methods and software for providing an energy-efficient base station with synchronization. In one embodiment a method may be disclosed, the method including performing traffic analysis to determine off-peak hours duration when traffic is light; updating downlink and uplink schedulers to transmit a minimum required signaling and control information; and wherein updating downlink and uplink scheduler for minimum required signaling and control information further comprises scheduling, in a downlink direction, at least one of transmitting only reference symbols over selected OFDM symbols, PDCCH on up to a first three OFDM symbols, PSS and SSS on a central six PRBs and PBCH. The method may further include updating downlink and uplink scheduler for minimum required signaling and control information by scheduling, in an uplink direction, transmitting at least one of only PUCCH and PRACH.

In another embodiment, a computer readable medium may be disclosed for providing an energy-efficient base station with synchronization. The computer-readable medium contains instructions for providing an energy efficient base station with synchronization which, when executed, cause a node to perform steps including performing traffic analysis to determine off-peak hours duration when traffic is light; updating downlink and uplink schedulers to transmit a minimum required signaling and control information; and wherein updating downlink and uplink scheduler for minimum required signaling and control information further comprises scheduling, in a downlink direction, at least one of transmitting only reference symbols over selected OFDM symbols, PDCCH on up to a first three OFDM symbols, PSS and SSS on a central six PRBs and PBCH. The computer readable medium may further include instructions for updating downlink and uplink scheduler for minimum required signaling and control information by scheduling, in an uplink direction, transmitting at least one of only PUCCH and PRACH.

In another embodiment, a system may be disclosed for providing an energy-efficient base station with synchronization, the system including a node configured to perform traffic analysis to determine off-peak hours duration when traffic is light; update downlink and uplink schedulers to transmit a minimum required signaling and control information; and wherein the downlink and uplink scheduler are updated for minimum required signaling and control information, including scheduling, in a downlink direction, at least one of transmitting only reference symbols over selected OFDM symbols, PDCCH on up to a first three OFDM symbols, PSS and SSS on a central six PRBs and PBCH. The system may update downlink and uplink scheduler for minimum required signaling and control information by scheduling, in an uplink direction, transmitting at least one of only PUCCH and PRACH.

DETAILED DESCRIPTION

Figure 1:
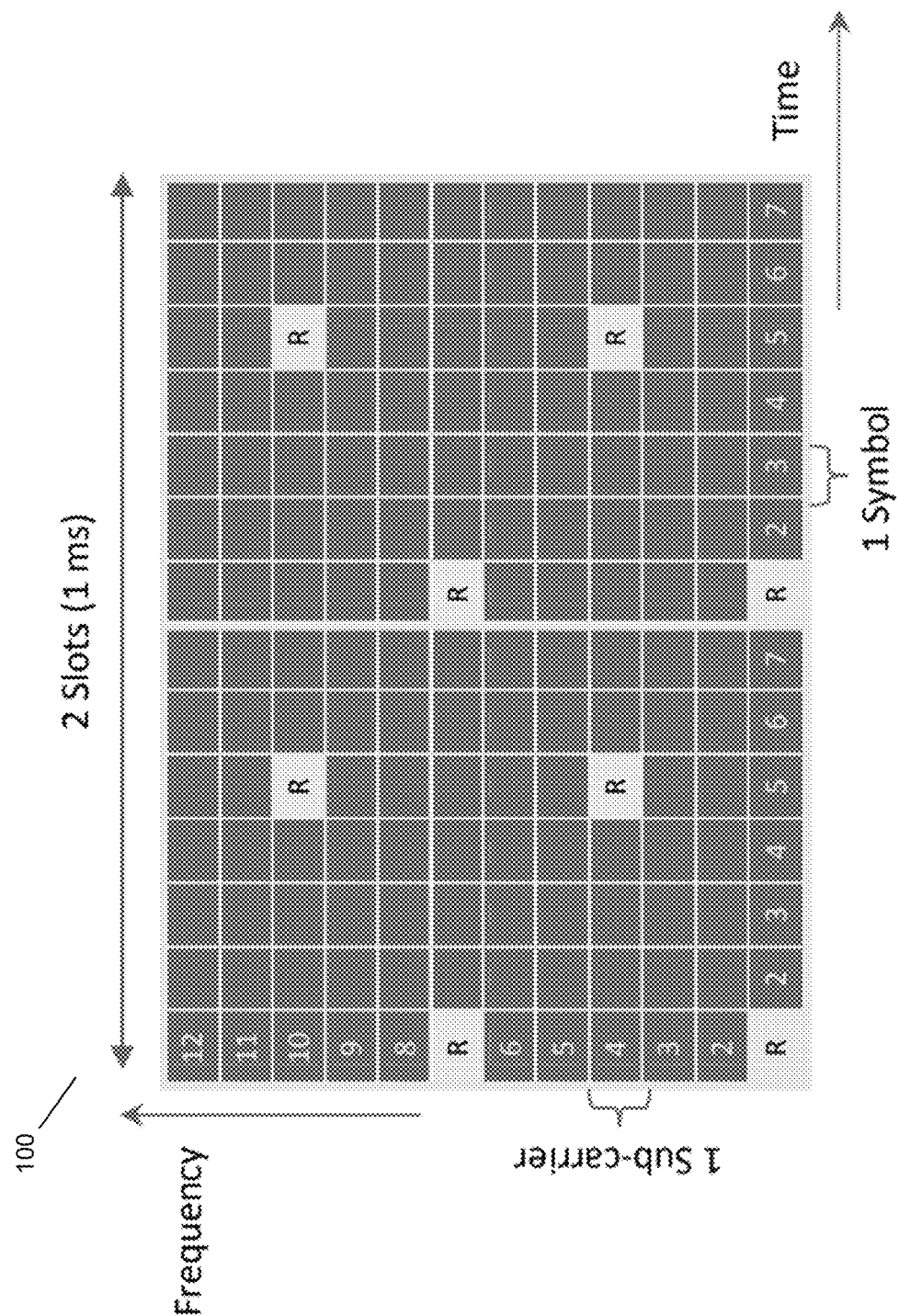
FIG. 1 is a diagram showing downlink reference symbols within a RB for a one antenna system for normal CP, in accordance with some embodiments.

FIG. 1 is a diagram 100 showing the location of downlink reference symbols within a RB for a one antenna system for a normal CP. For coherent demodulation at the user equipment (UE), reference symbols (RSs) are inserted in the OFDM time-frequency grid to allow for channel estimation. Downlink reference symbols are inserted within the first and third last OFDM symbol of each slot with a frequency domain spacing of six sub carriers. In case of two transmit antennas, reference signals are inserted from each antenna, where reference signals on the second antenna are offset in the frequency domain by three subcarriers. Nothing is transmitted on the other antenna at the same time-frequency location of the reference signals to allow the UE to accurately estimate the channel coefficients.

Figure 2:
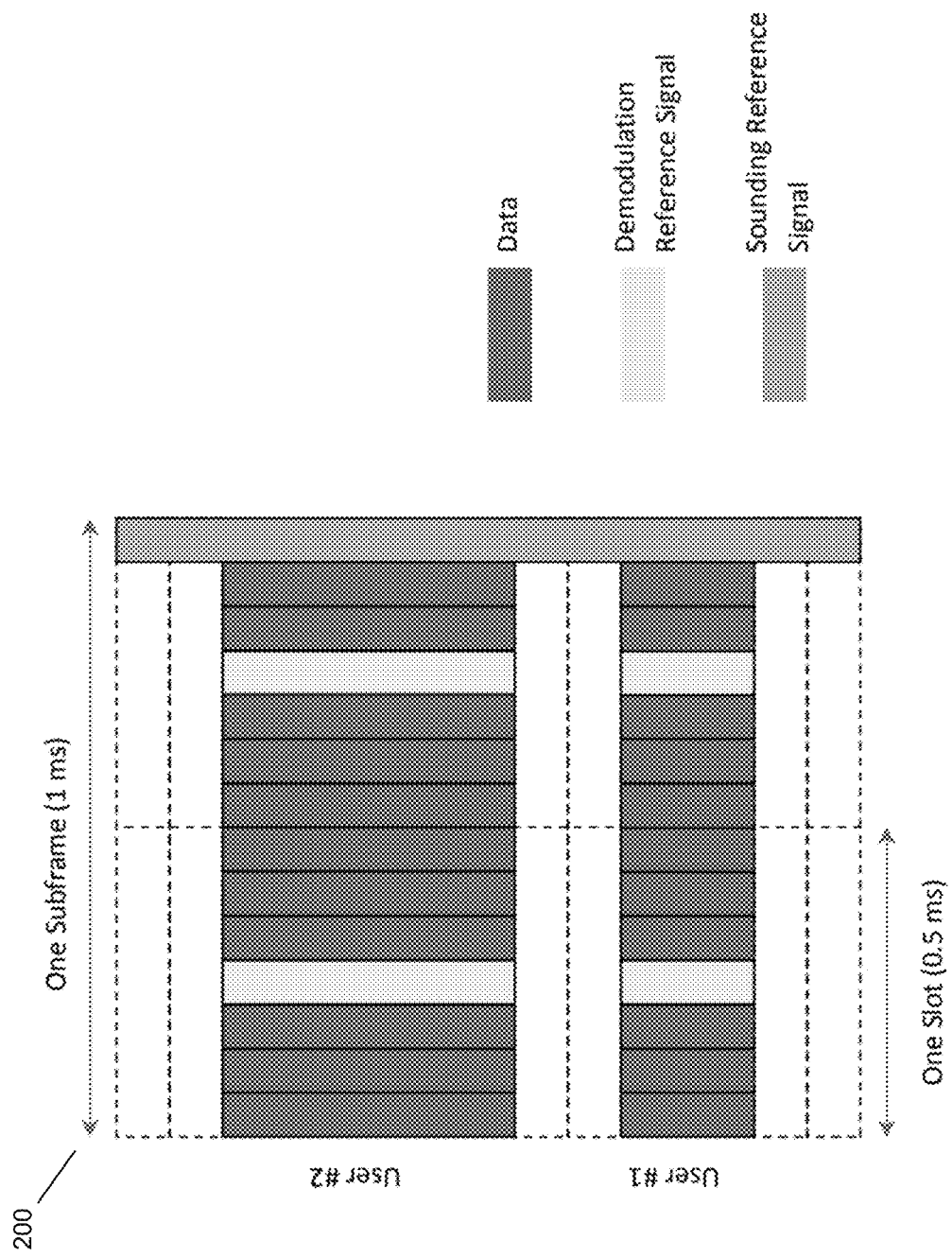
FIG. 2 is a diagram showing uplink demodulation and sounding channel reference signals in normal CP mode, in accordance with some embodiments.

FIG. 2 is a diagram 200 showing uplink demodulation and sounding channel reference signals (normal CP mode). There are two types of reference signal for uplink transmission: Demodulation Reference Signals (DM-RS) and Sounding Reference Signal (SRS). DM-RS is time multiplexed with uplink data and are used to enable coherent signal demodulation at the base station, e.g. eNodeB. SRS is used to allow channel dependent uplink scheduling and is shared among users with different transmission bandwidth.

Figure 3:
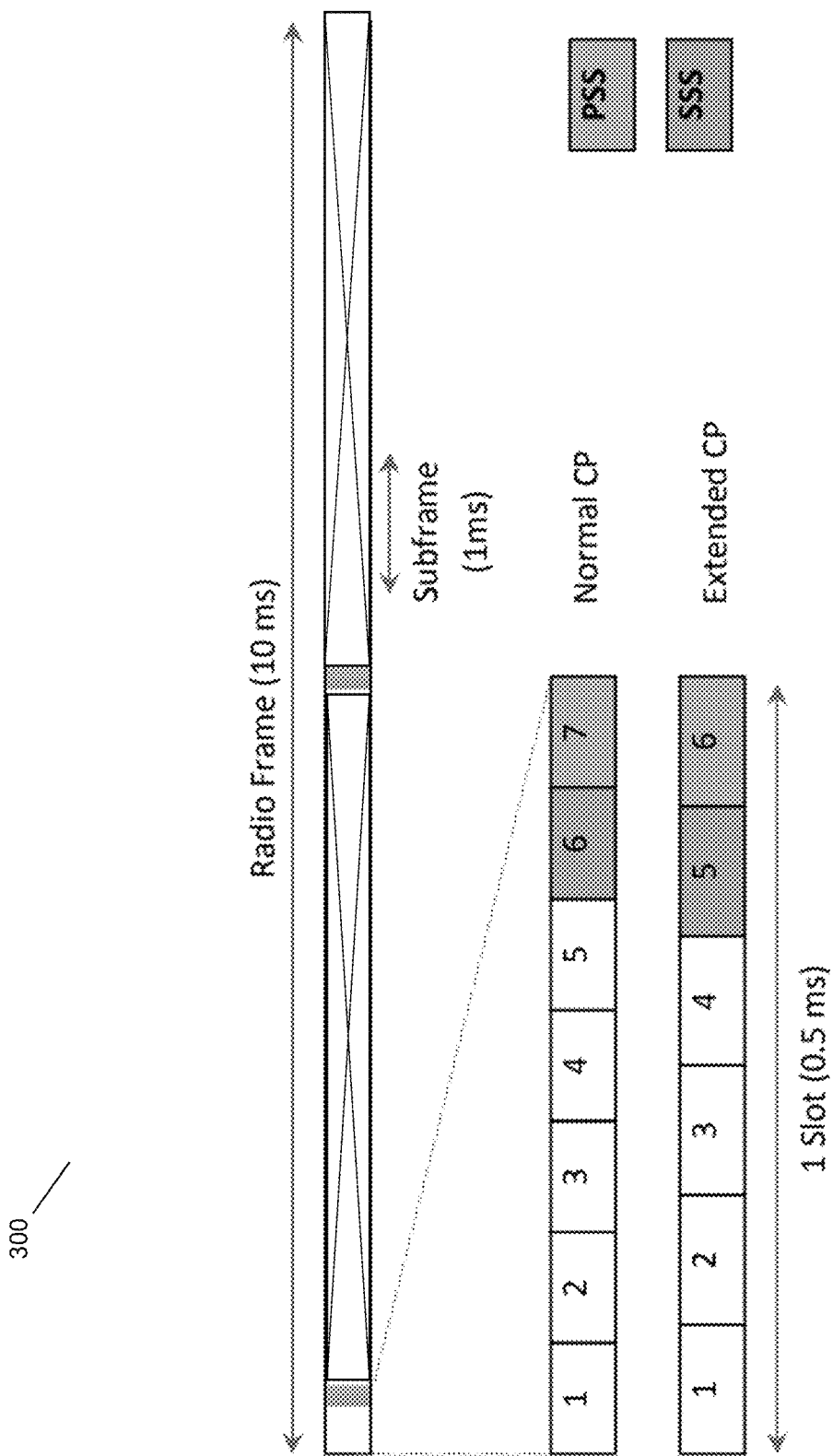
FIG. 3 is a diagram showing a synchronization signal frame and slot structure in a time domain, in accordance with some embodiments.
Figure 4:
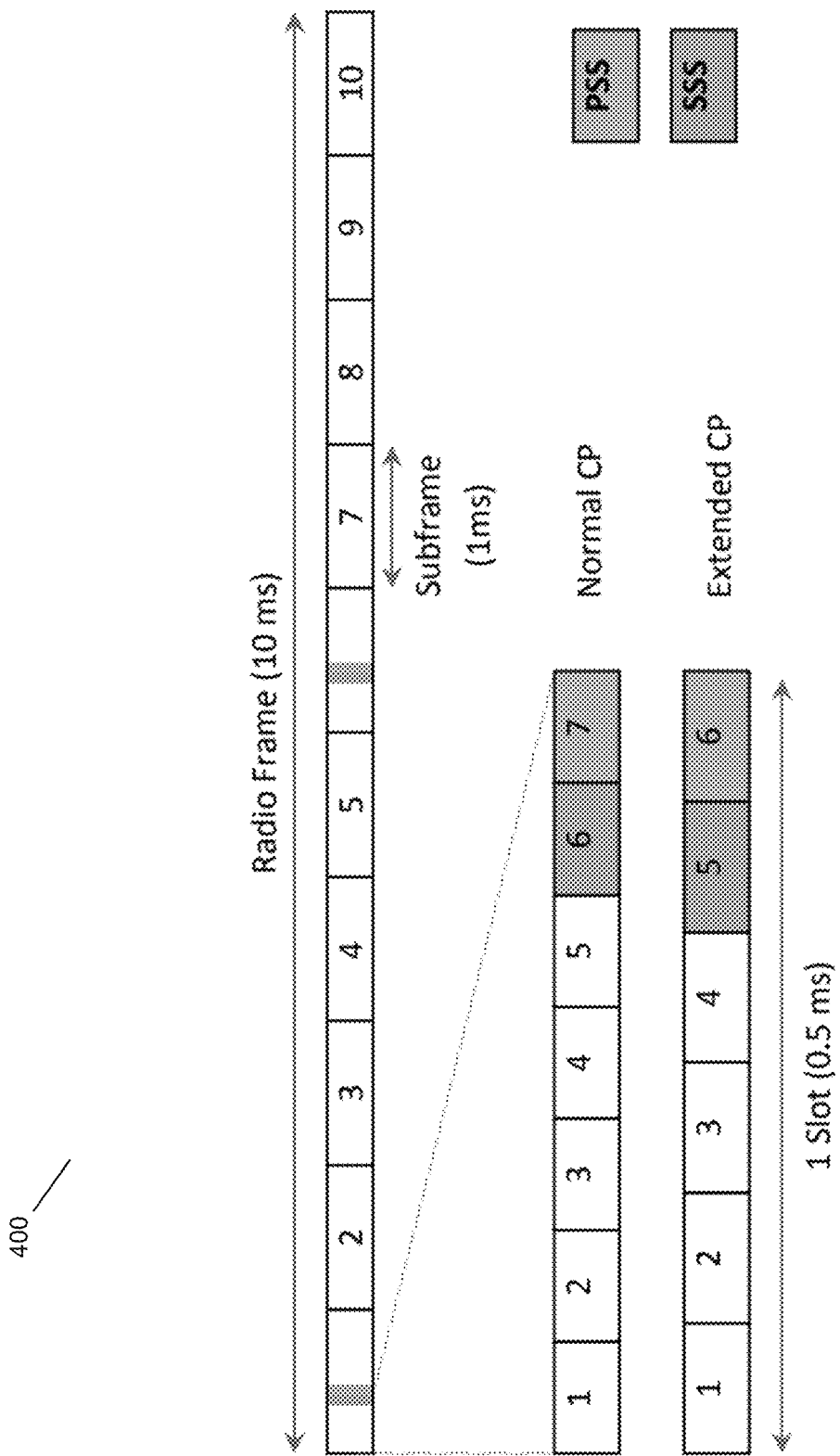
FIG. 4 is a diagram showing a synchronization signal frame and slot structure in a time domain, in accordance with some embodiments.

FIG. 3 and FIG. 4 are diagrams 300 and 400 showing synchronization signal frame and slot structure in time domain. There are two types of reference signal for uplink transmission: Demodulation Reference Signals (DM-RS) and Sounding Reference Signal (SRS). DM-RS is time multiplexed with uplink data and are used to enable coherent signal demodulation at the base station, e.g. eNodeB. SRS is used to allow channel dependent uplink scheduling and is shared among users with different transmission bandwidth Synchronization sequences represent series of steps performed by a user equipment (UE) to access the LTE system during cell search. Synchronization sequences during cell search helps UE to determine time and frequency parameters required to demodulate downlink signals; to transmit with correct timing; and to acquire some critical system parameters. There are three synchronization requirements: symbol timing acquisition, to determine correct symbol start, carrier frequency synchronization to mitigate the effect of frequency errors resulting from Doppler shift and errors from electronics components and sampling clock synchronization UE uses following two special signals broadcast on each cell by the base station during cell search procedure for initial access to an LTE system and for handover to a neighbor cell: Primary Synchronization Sequence (PSS) and Secondary Synchronization Sequence (SSS). Detection of PSS and SSS allows the UE to complete time and frequency synchronization and to acquire useful system parameters, e.g., cell identity, access mode (TDD/FDD), and cyclic prefix length. Synchronization signals are transmitted twice per radio frame of 10 ms duration. Synchronization Signals (Reference Symbol, PSS, SSS) in a frame structure for time and frequency domain.

Figure 5:
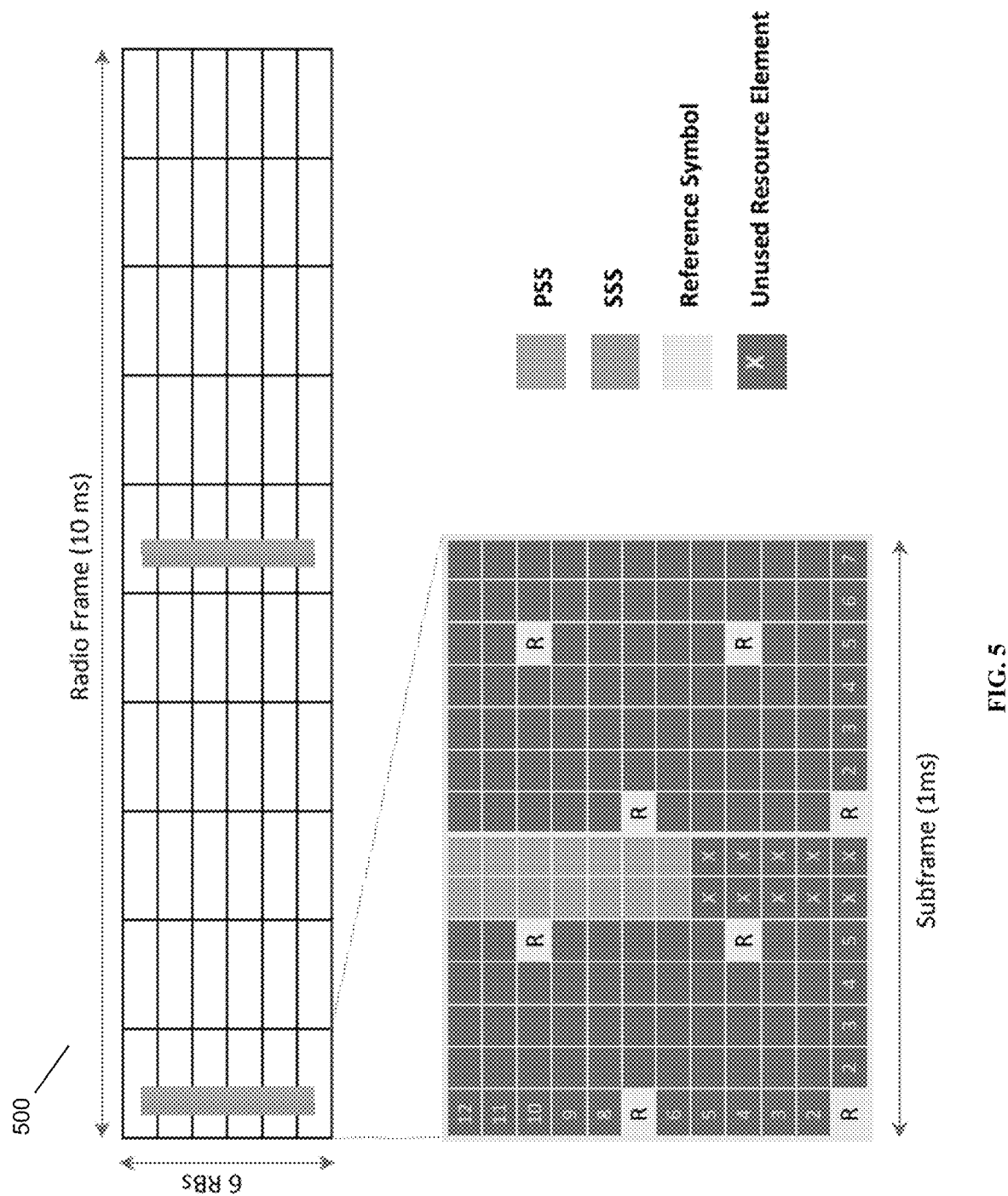
FIG. 5 is a diagram showing synchronization signals frame structure in frequency and time domain, in accordance with some embodiments.
Figure 6:
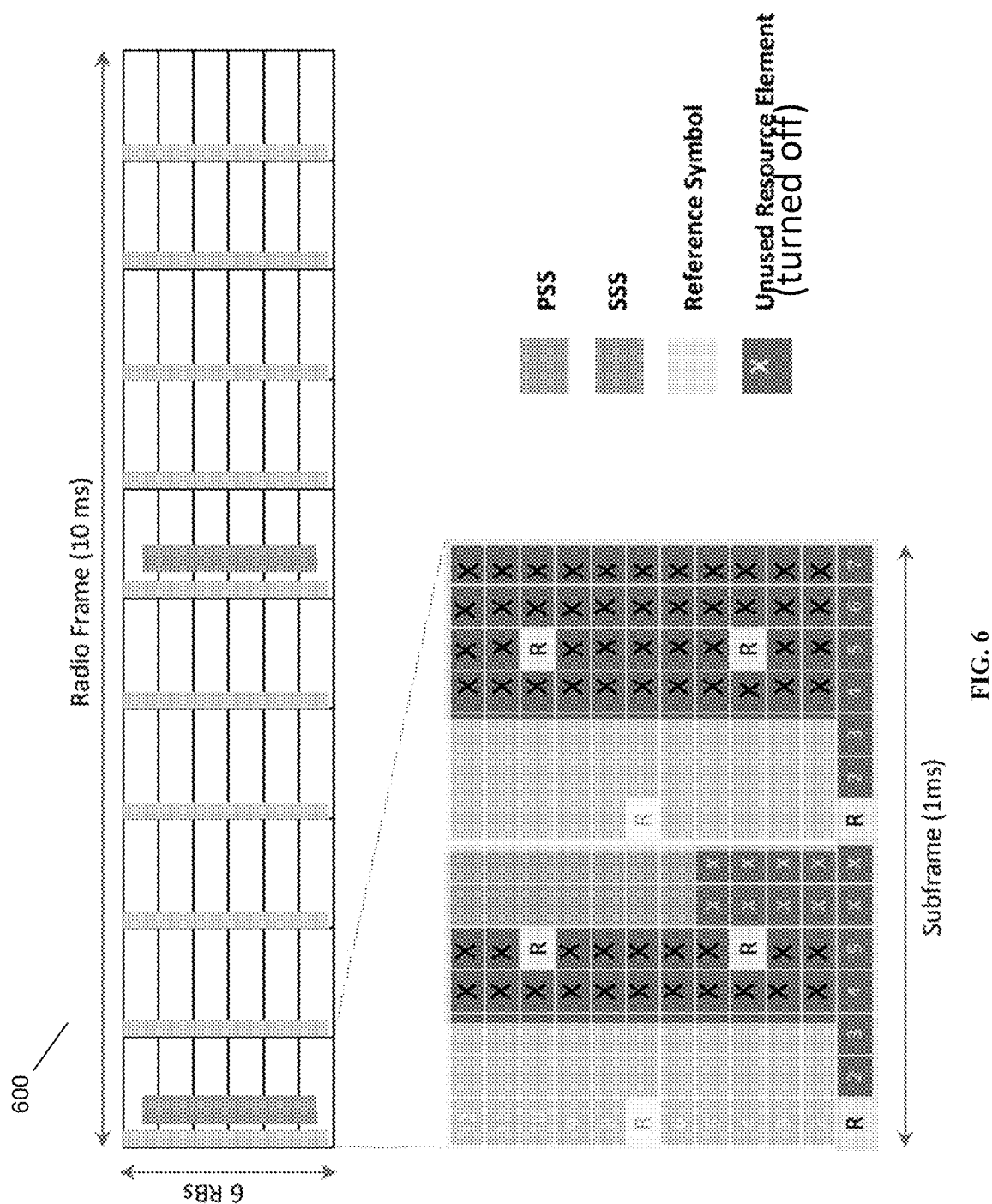
FIG. 6 is a diagram showing synchronization signals frame structure in frequency and time domain, in accordance with some embodiments.

FIG. 5 and FIG. 6 are diagrams 500 and 600 showing synchronization signals frame structure in frequency and time domain. FIG. 5 and FIG. 6 shows unused resources are turned off if not required.

Figure 7:
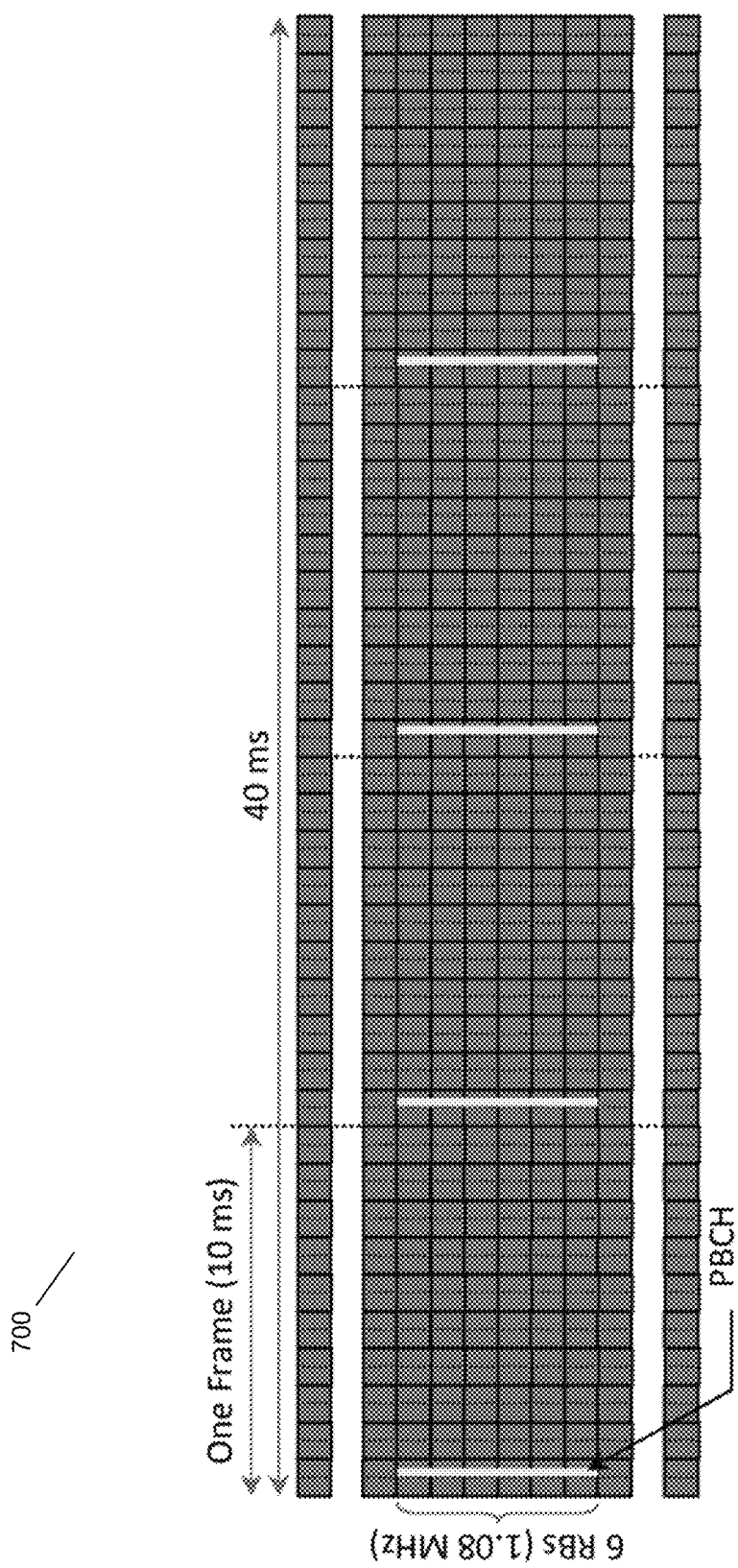
FIG. 7 is a diagram showing BCH structure, in accordance with some embodiments.

FIG. 7 is a diagram 700 showing PBCH Structure. In an LTE system, downlink physical channels, transport channel and control channel, carry information blocks received from the medium access control (MAC) and higher layers. Transport Channels include Physical Broadcast Channel (PBCH), structure shown in FIG. 10, Physical Downlink Shared Channel (PDSCH) and Physical Multicast Channel (PMCH).

The Physical Broadcast Channel (PBCH) broadcasts a below listed limited number of parameters essential for initial cell access in 14 bits long Master Information Block. Downlink system bandwidth, Physical Hybrid ARQ Indicator Channel structure and the most significant eight-bits of the System Frame Number. PBCH is detectable without prior knowledge of system bandwidth and accessible at cell edge, thereby making the base station detectable in a cell.

The Physical Downlink Shared Channel (PDSCH) is the main data bearing channel allocated to users on a dynamic and opportunistic basis. Transmits broadcast information not transmitted on PBCH, e.g., System Information Blocks (SIB) and paging messages.

The Physical Multicast Channel (PMCH) is a physical layer structure to carry multimedia broadcast and multicast services (MBMS).

Figure 8:
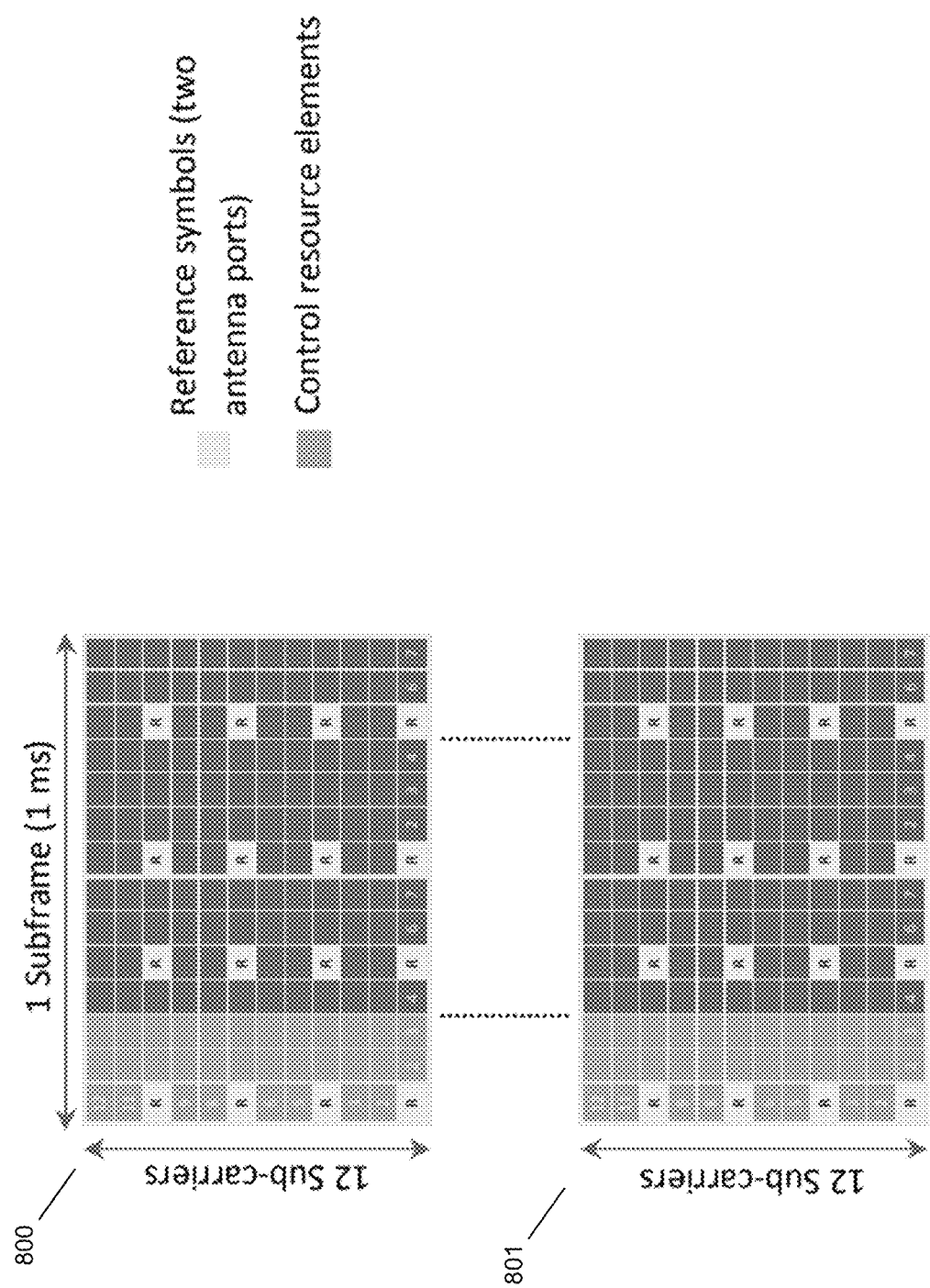
FIG. 8 is a diagram showing control channel signaling region using three OFDM symbols, in accordance with some embodiments.

FIG. 8 shows two diagrams 800 and 801 for Control Channel Signaling Region (3 OFDM Symbol Example). The control channel occupies the first 1, 2, or 3 OFDM symbols in a subframe extending over the entire system bandwidth. In narrow band systems, i.e. less than 10 RBS, the control symbols can include four OFDM symbols. The Control channels for downlink transmission are: Physical Downlink Control Channel (PDCCH), Physical Control Format Indicator Channel (PCFICH), and Physical Hybrid ARQ Indicator Channel (PHICH).

Physical Downlink Control Channel (PDCCH) carries resource assignment information for UEs contained in Downlink Control Information (DCI) message. Multiple PDCCHs can be transmitted in the same subframe using Control Channel Elements (CCE) each of which is a nine set of four resource elements known as Resource Element Groups (REG). Uses QPSK modulation Physical Control Format Indicator Channel (PCFICH) carries Control Framer Indicator (CFI), which includes the number of OFDM symbols used for control channel transmission in each subframe. Typically 1, 2, or 3 OFDM symbols. 32-bit long CFI mapped to 16 Res in the first OFDM symbol of each downlink frame using QPSK modulation.

Physical Hybrid ARQ Indicator Channel (PHICH) carries Hybrid ARQ ACK/NAK, which indicates to the UE whether the base station correctly received uplink user data carried on the physical uplink shared channel (PUSCH). Uses BPSK modulation.

Figure 9:
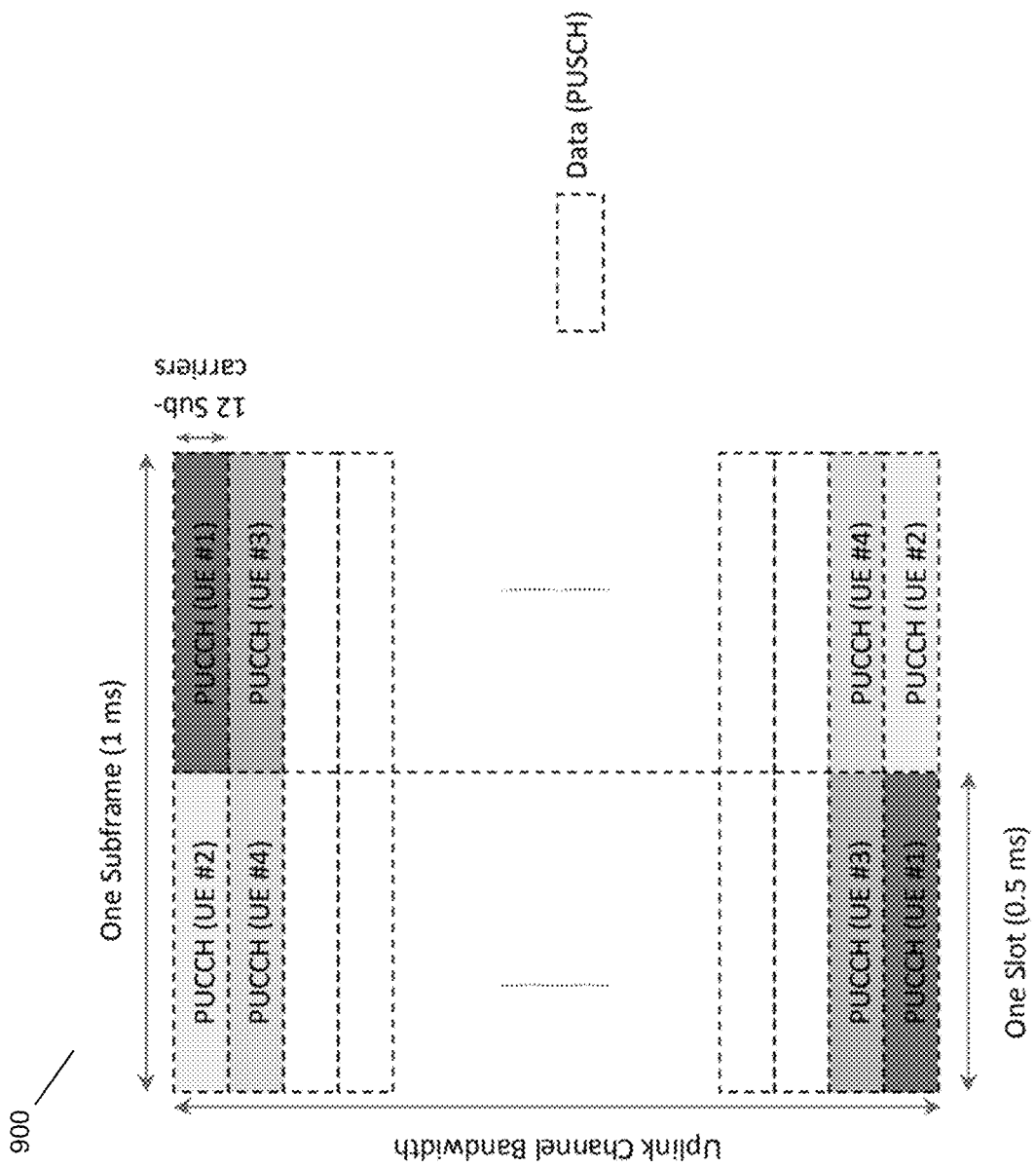
FIG. 9 is a diagram showing a physical uplink control channel structure, in accordance with some embodiments.
Figure 10:
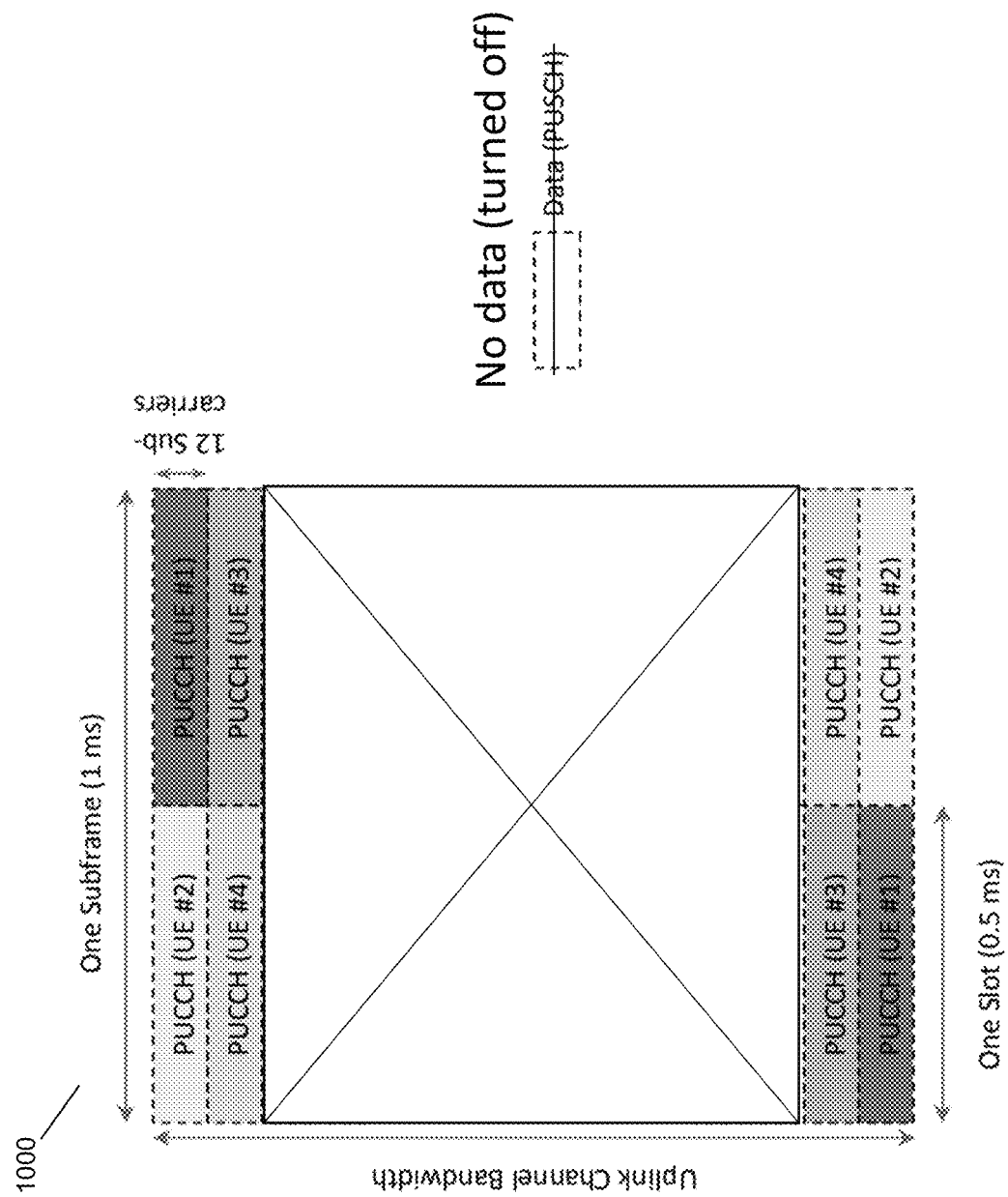
FIG. 10 is a diagram showing a physical uplink control channel structure, in accordance with some embodiments.

FIG. 9 and FIG. 10 are diagrams 900 and 1000 of the Physical Uplink Control Channel Structure. There are three physical layer channels defined for uplink transmission in LTE: Physical Uplink Shared Channel (PUSCH), Physical Uplink Control Channel (PUCCH), shown in FIG. 9 and FIG. 10 and Physical Random Access Channel (PRACH). As shown in FIG. 10, a resource may be turned off if there is no data.

Physical Uplink Shared Channel (PUSCH) carries user data, and any control information necessary to decode information such as format indicators and MIMO parameters. Scheduling interval is similar to the downlink. Supports QPSK, 16 QAM, and 64 QAM (optional) modulation.

Physical Uplink Control Channel (PUCCH) carries Control signaling comprising HARQ ACK/NACK, Channel quality indicators (CQI), MIMO feedback (Rank Indicator, RI; Precoding Matrix Indicator, PMI), scheduling requests for uplink transmission, supports BPSK or QPSK modulation and Typical number of PUCCH regions for different system bandwidths shown below in TABLE 1

| System Bandwidth (MHz) | 1.25 | 2.5 | 5 | 10 | 15 | 20 |
|---|---|---|---|---|---|---|
| PUCCH Control Regions | 1 | 2 | 4 | 8 | 12 | 16 |
| Number of Resource Blocks | 2 | 4 | 8 | 16 | 24 | 32 |

Figure 11:
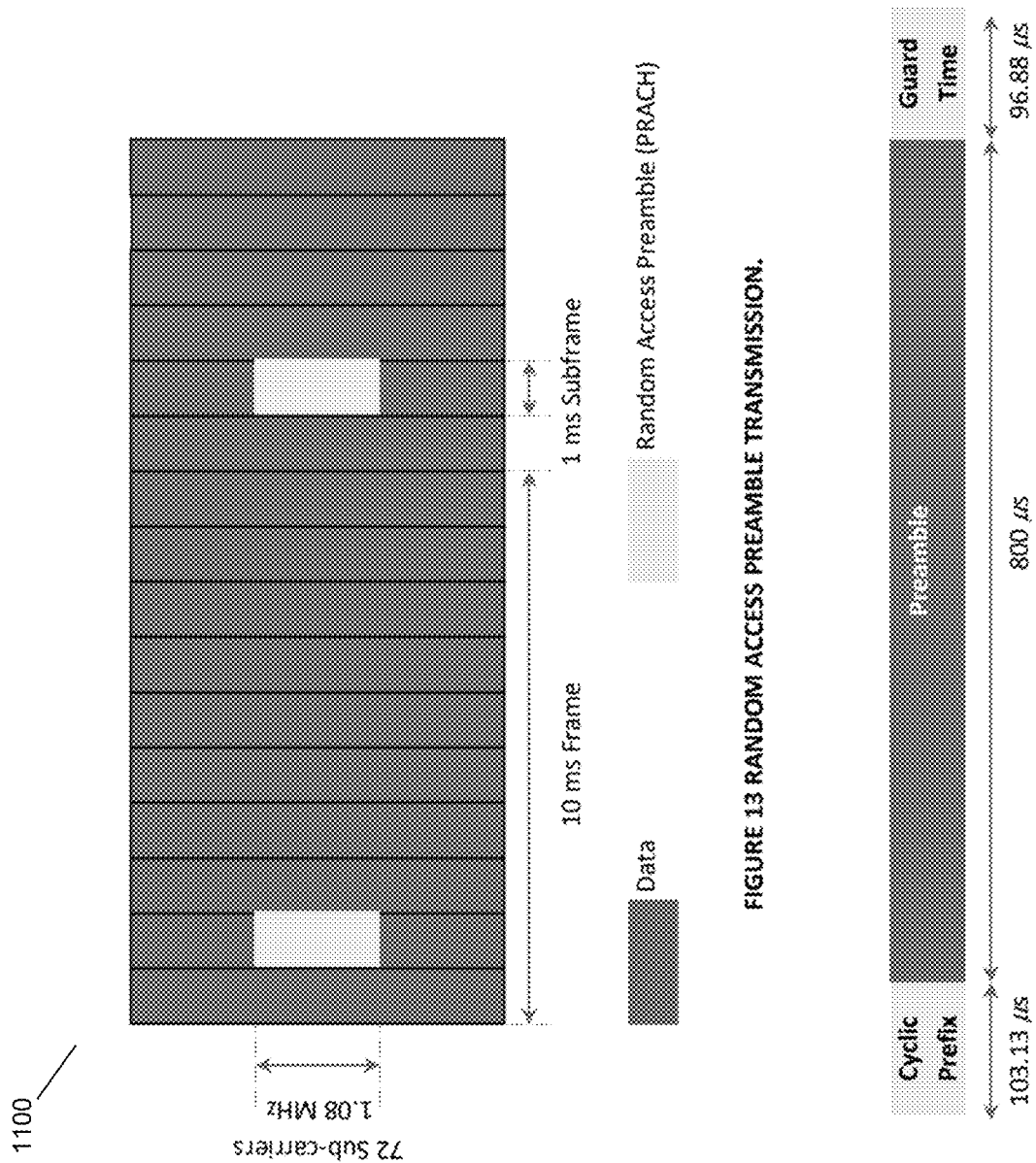
FIG. 11 is a diagram showing random access preamble, in accordance with some embodiments.
Figure 12:
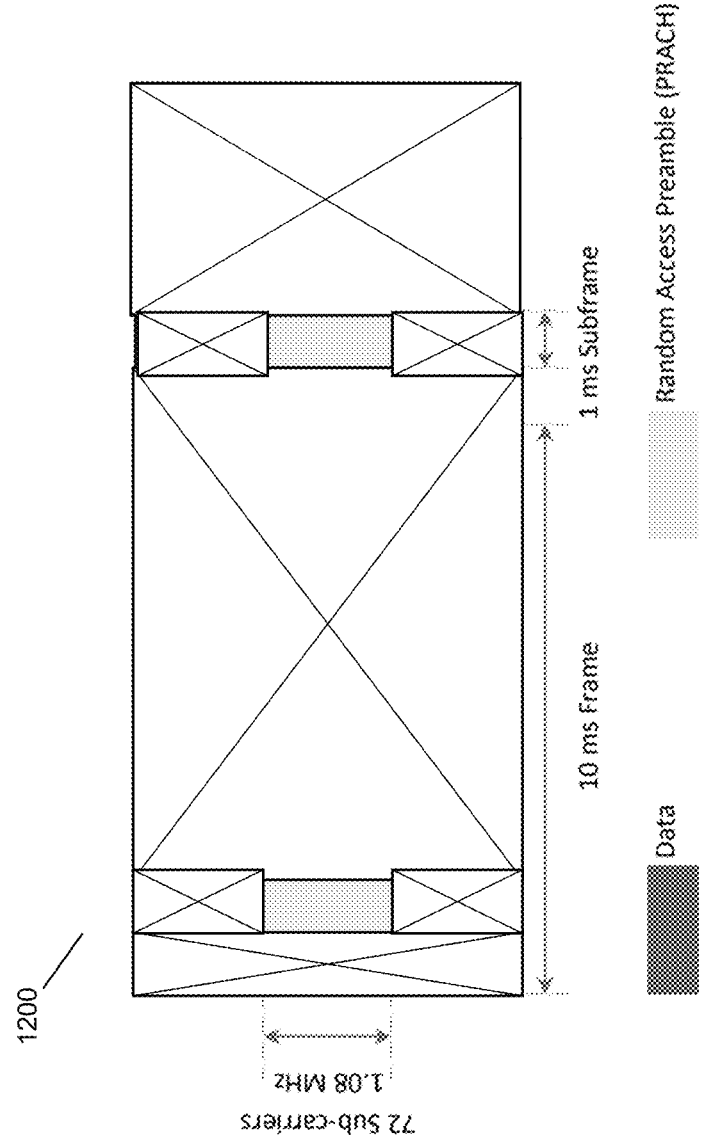
FIG. 12 is a diagram showing random access preamble, in accordance with some embodiments.
Figure 12:
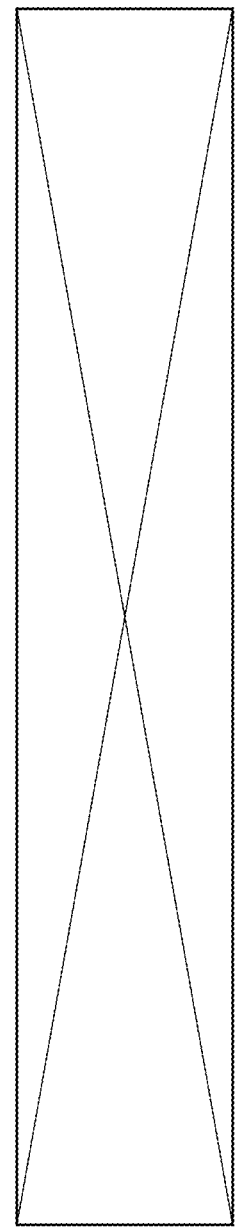
Figure 13:
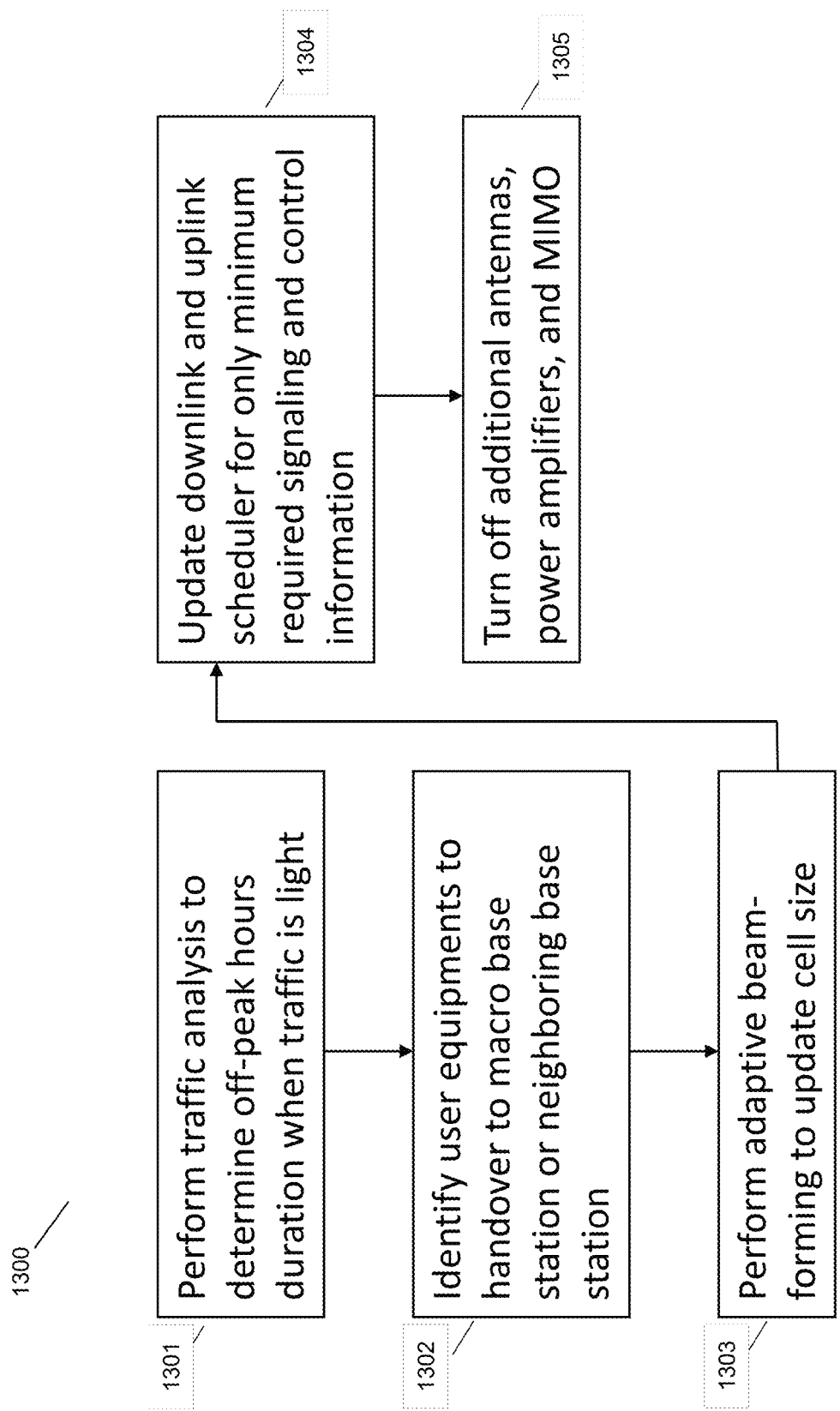
FIG. 13 is a flow diagram showing an embodiment for performing energy-efficient base station with synchronization, in accordance with some embodiments.

Physical Random Access Channel (PRACH) carries random access preamble a UE sends to access the network in non-synchronized mode and used to allow the UE to synchronize timing with the base station. Various preamble formats with different preamble and cyclic prefix duration accommodates different cell sizes. Preamble format 0, which is well suited for small to medium cell size cells, shown in FIG. 11 and FIG. 12. FIGS. 12 and 13 show a Random Access Preamble 1100 and 1200.

Technical Solution

In an example embodiment, a method to achieve energy efficiency for a 4G LTE eNodeB includes through statistical analysis identify the period of a day when there are very few users in the system, or identify the LTE users that can be offloaded to another access mechanism or radio access technology (RAT) system. Use adaptive beamforming techniques to reduce the cell size to handover users to macro base station. Energy efficiency can be achieved by transmitting only the following on downlink direction: reference symbols on selected tones over selected OFDM symbols, PDCCH on to the first 3 OFDM symbols, PSS and SSS on the central 6 PRBs and PBCH. The above listed channels are bare minimum for base station detection by the UE during cell search procedure. Only enable PUCCH and PRACH for the uplink transmission, and turn off everything else in the uplink direction. For a 20 MHz LTE system with 100 PRBs, only 8 PRBs (max) for PUCCH and 6 PRBs for PRACH needed. In the frequency domain, overall energy efficiency may be improved by configuring PUCCH and PRACH in a sparse manner.

Since very few users are active during the identified off-peak hours or night time, and only a bare minimum signals are transmitted by the base station, in yet another embodiment, only one transmit antenna is sufficient to transmit the minimum required signaling tones (antenna/MIMO muting). This brings additional benefit of turning off power amplifiers for disabled transmit antenna during off-peak hours or night time. This only requires $\frac{1}{10}$th or $\frac{1}{20}$th of the maximum power during the base station idle mode operation.

Antenna/MIMO Muting

MIMO is not energy efficient when there is no data to transmit, particularly during off-peak hours and night time. Turning off MIMO, therefore, during off-peak hours reduces power consumption. Similarly, antennas may also be turned off during off-peak hours and may further reduce base station's power consumption. Because additional antennas are muted, associated power amplifiers are also turned off, and increase energy efficiency of the base station significantly.

While the above embodiments for improving energy efficiency may be implemented at the base station supporting multi radio access technology such as 2G, 3G, 4G, 5G, Wi-Fi etc., the coordinating server situated in the radio access network (RAN), and acting as a gateway between base stations in the RAN and the mobile core network, may also collect necessary information from the base stations over X2 interface and provide instructions to the base stations for improving energy efficiency at the base stations. The sample base station and the coordinating server are shown here.

Flow charts of particular embodiments of the presently disclosed methods are depicted in FIG. 13. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language or hardware implementation. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

FIG. 13 shows a flow diagram of a method 1300 for providing an energy-efficient base station with synchronization. Processing block 1301 recites performing traffic analysis to determine off-peak hours duration when traffic is light. Using self-organizing network (SON) module and analysis of the big data and user reports for various user activity, billing records, handover requests, etc. identify active users traffic pattern. Based on analysis, determine the time of a day, the day of a week, when the number of active users are below a user defined threshold value (off-peak hours) to trigger actions for energy efficient 4G LTE eNodeB.

Processing block 1302 discloses identifying user equipments to handover to macro base station or neighboring base station. The 4G LTE eNodeB can increase its energy efficiency during the off-peak hours if it can handover user equipments latched to the eNodeB to macro base station. As more user equipments are served by the macro base station or neighboring cells, the energy efficiency can be increased as less power is needed to serve the users Processing block 1303 states performing adaptive beamforming to update cell size. In order to handover the user equipments latched to the eNodeB to neighboring cells or macro base stations, techniques to reduce the cell size may be employed. Technologies such as beam tilt, multi-beam, adaptive array and active antennas may be used to fit the desired capacity and coverage requirement during off-peak hours.

Processing block 1304 discloses updating downlink and uplink scheduler for only minimum required signaling and control information. Further energy efficiency may be achieved by updating uplink and downlink scheduling of the 4G LTE eNodeB, either at the LTE eNodeB or at a coordinating server, to transmit only bare minimum signaling tones and control channel signaling e.g., in the downlink direction, scheduling may be updated to transmit only: reference symbols on selected tones over selected OFDM symbols PDCCH on to the first 3 OFDM symbols, PSS and SSS on the central 6 PRBs, PBCH, and e.g., in the uplink direction, scheduling may be updated to transmit only PUCCH and PRACH.

Processing block 1305 recites turning off additional antennas, power amplifiers and MIMO. Since the number of users being served by 4G eNodeB are reduced through measures take at blocks 1302 and 13033, further more energy efficiency may be achieved by antenna and MIMO muting, and turning off power amplifiers. Only power amplifier for active antenna may be required to be turned on RF Power Amplifiers of 2G/3G base station system consumes large amount of power. Therefore, decreasing the power used at the power amplifier is top most factor for increasing the energy efficiency for 2G/3G base station.

The following techniques may be employed to increase energy efficiency: increase the linearity of the power amplifier: linearity of the power amplifier may be increased using feedforward, pre-distortion, cartesian feedback, digital pre-distortion, Doherty Power Amplifier, and crest factor reduction. While LD-MOS power transistor is used currently for base station amplifier, Gallium Nitride (GaN) based semiconductor power devices or RF components may be used to improve energy efficiency.

Method to Achieve Energy Efficiency for a 2G/3G Base Station

Remove the feeder cable loss by reducing the distance between the antenna and the base station with RF equipment and amplifier modules. A multi-sector base station tower configured with radio heads mounted in a triangular configuration, where the base station may be located very close to the remote radio heads (RRHs) reduces the feeder cable loss caused in a typical deployment. The short distance and placement of the base station and RRHs as described above allows the use of high-bandwidth radio technologies, e.g., Wi-Gig, etc.

Further energy efficiency may be achieved through base station site optimization by using natural cooling instead of electrical power based cooling system since base station is mounted on a tower. Using alternate energy sources, e.g., solar panels, wind power, fuel cell, picohydro, etc., based on the environment of the base station deployment site to generate or supplement the necessary electrical power requirements. Configuring antennas and power amplifiers in either standby or shutdown mode based on analysis of the traffic pattern during off-peak traffic hours improves energy efficiency of the 2G/3G base station system.

A 5G base station with a massive MIMO system offers benefit of improved transmission rate, but contrary to 2G/3G/4G base station, the 5G base station consumes slightly more than 50% of total energy, i.e., energy required for transmission power is comparable to computational power at the base station. Techniques used for energy efficiency for 4G LTE eNodeB, e.g. antenna and MIMO muting, may also be employed for energy efficient 5G base station.

Techniques used for energy efficiency for 2G/3G base stations for reducing feeder cable loss, using natural cooling and/or keeping heat dissipation from the base station module below the transmitter output power, and using alternative energy source may bring further improvement in energy efficiency. The base station may be transitioned into a standby/sleep mode during off-peak hours to reduce power consumption. Software-defined networks or software-defined radios may be employed to reduce the computational power requirements of the 5G base station along with the use of cloud computing at a coordinating server in a radio access network or in a core network In general, for most cellular RF PA's (Macro, Micro), Doherty is used for efficiency, along with DPD to provide the linearization (removal of spurious) at a reasonable cost ($). Other techniques exist with increased efficiency, but at a greater cost unless consideration of much higher powers than are needed for cellular e.g. broadcast, it can be difficult to justify the expense. As far as switching PA's on and off—you need to consider thermal effects in the PA of rapid surges/spikes are involved. Rapid switching is a problem resulting in thermal memory deep inside the PA device. However, in this case, I'd consider it more in terms of coverage area. If you reduce the power (irrespective of time) you shrink the cell and remove coverage from the network. If we can continue to "broadcast" in the cell and provide full cell coverage, that would be better. Or if it were permitted to broadcast less frequently. If the network knows that no active users are in a cell, near the cell, or likely to turn-on in the cell, then this might work. Sort bursts of power will carry less data further, long burst of low power will carry more data, but over a shorter distance. PAs could be tuned in software to improve their efficiency in each case, but we would need more detail to work out the savings.

The PAs consume the majority of the power (at 8-12 W RF typical—assume 3-4× energy input—they typically cover 500 Mhz wide (smaller channels of that 500 Mhz but they need to span it). If they can power it down even for milliseconds it can save a lot of energy. Managing the scheduler to pack resource blocks into contiguous time with as much time between them has a lot of value. If this is managed properly, then all we need is a perfect sync to the VSAT (perhaps the idea of sync-area-network whether wireless or otherwise) and the VSAT can much more intelligently such down the PA. When trying to make rural work with VSATs this can materially reduce the size of the solar panels/backup batteries. This also helps the CWS turn off the PA. This also plays into MIMO—if know MIMO transmit is giving us very little for a given user—the scheduler can be managed further for those users on the second PA to be as close together as possible. It is further possible to run satellite baseband from extra 20 Mhz channels on a future Octasic powered CWS (the modulations seem comparable to a handset, 12 Mhz UL channels/20 Mhz DL channels) of course you have to get the baseband to/from the VSAT PA/receiver—in this configuration perhaps wigig is the way to go.

Also the satellite does have a source sync that is accurate to 1 ppb—they use it to minimize guard bands for the MPTP transmissions. One way to not let any UE to access our eNB when our eNB is in hyper energy efficient mode is to increase the Qrxlev-min target that is broadcast by the eNB. If this target is very high, the UE won't even get to camp on our eNB. That further reduces the UL processing requirements. Another idea is that with a 2-tx MIMO eNB, we can completely turn off the second PA and then enable only the basic DL and UL control channels (as described earlier). This will further improve the energy efficiency. With N tx antennas, you shut off N−1 PAs and the energy efficiency will be more than 96% when N=32 antenna ports. You can also decide when to turn on/off the system based on the analytics engine running in the back end (on the Core or in the Gateway). The goal is to make the eNB energy efficient. This means not only the PAs for downlink transmission, but also the uplink receiver blocks. Say, we have very few users in the system, and would like to offload the LTE users to some other access mechanism. In rural areas, we might have zero users in the night (after 10 PM) and before 6 AM.

Downlink: need to transmit reference signals on selected tones over selected OFDM symbols, need to transmit PDCCH on up to the first 3 OFDM symbols, need to transmit PSS and SSS on the central 6 PRBs, and need to transmit PBCH. The above channels are bare minimum we must transmit. All the transmit antennas are active (as we need to send antenna-specific reference signals), but we are sending very few tones we can significantly scale back the per-antenna transmit power. If we have a PA to do this, then we can only send $\frac{1}{10}$ or $\frac{1}{20}$ of the max power during the eNB idle mode operation.

Uplink: Ideally, the entire UL chain can be shut off. However, it makes sense to only keep the control and RACH processing on, and everything else off. That means, if you have a 20 MHz LTE system with 100 PRBs, and if you allocate 8 PRBs (max) for PUCCH and 6 PRBs for PRACH, your baseband is active only over 14/100=14% of the allocated PRBs. Further, since control channels and RACH can be configured in a sparse manner in the frequency-domain (by the eNB), you can increase the overall energy efficiency significantly.

Figure 14:
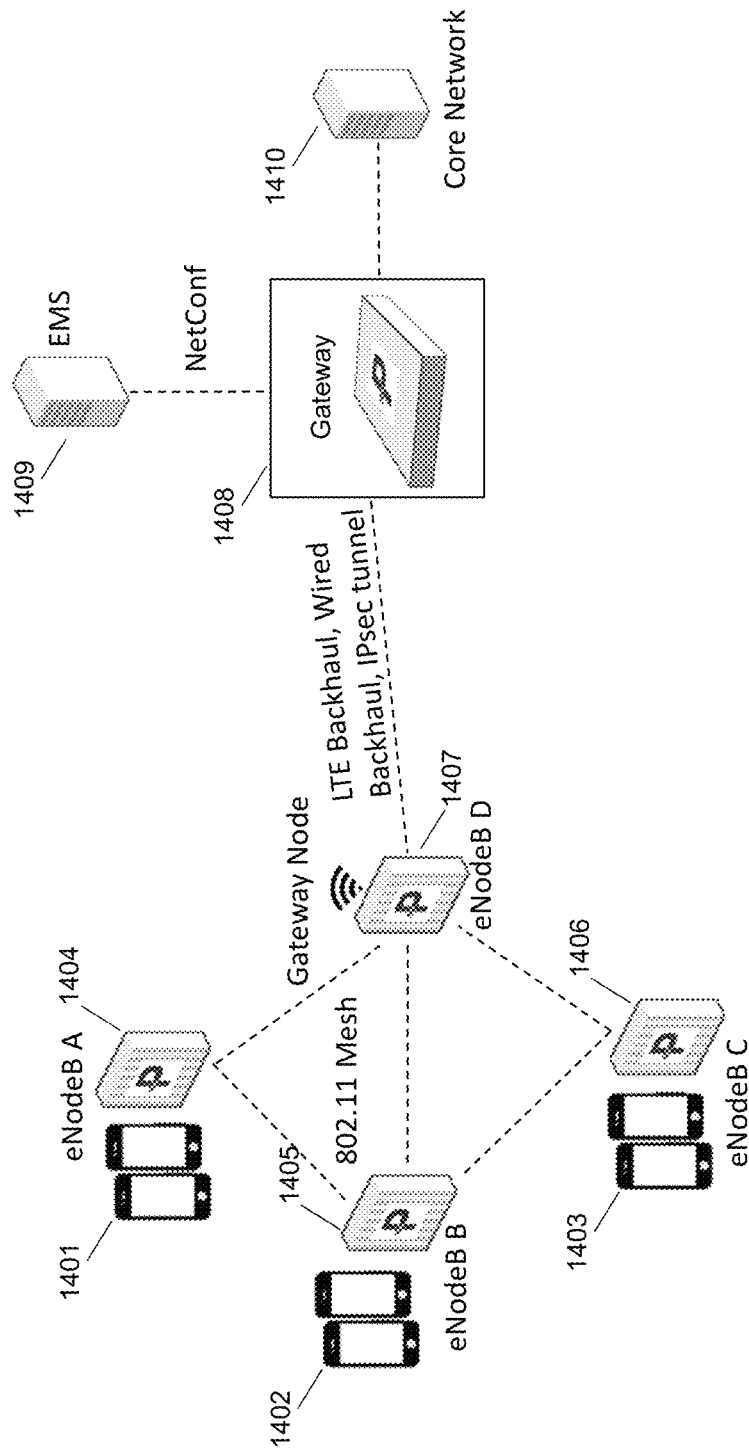
FIG. 14 is a diagram showing an exemplary deployment scenario, in accordance with some embodiments.

FIG. 14 is a diagram of a network 1400, in accordance with some embodiments. In the diagram, UEs 1401 are attached to eNodeB 1404, UEs 1402 are attached to eNodeB 1405, and UEs 1403 are attached to eNodeB 1406. eNodeBs 1404, 1405, 1406 are in communication using a gateway node 1407, which itself is an eNodeB as well. Gateway node 1407 has two backhaul connections (LTE and wired) to a gateway 1408, which is a coordinating node as described herein. Gateway node 1407 also has a secure IPsec tunnel with gateway 111. Gateway node 4107 also has a connection with edge node 1408. The gateway 1408 is connected to a core network 1410, and to an element management system (EMS) 1409 for managing the nodes in the network.

Figure 15:
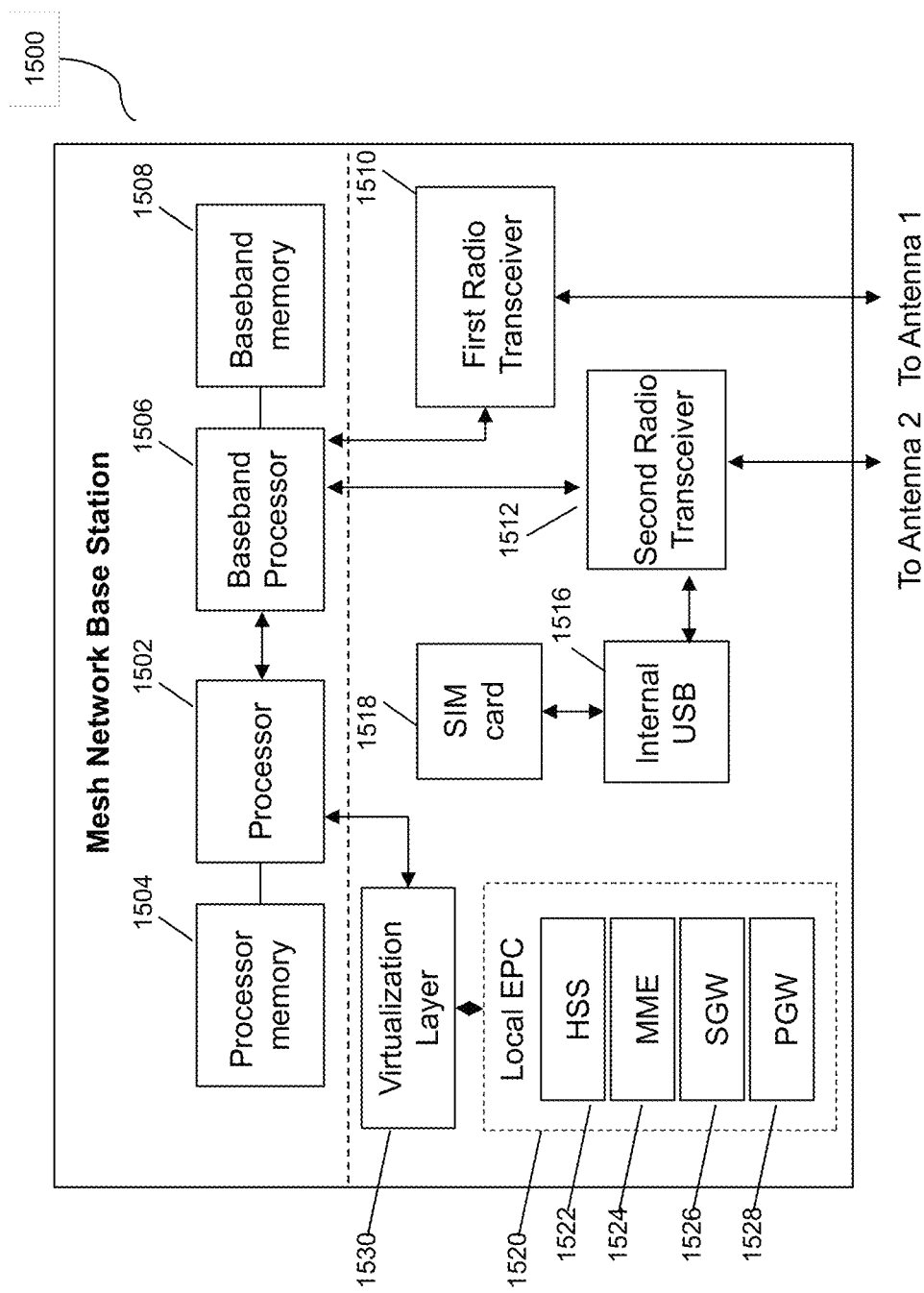
FIG. 15 is a diagram showing ran exemplary eNodeB, in accordance with some embodiments.

FIG. 15 is an enhanced eNodeB 1500 for performing the methods described herein, in accordance with some embodiments. Mesh network node 1500 may include processor 1502, processor memory 1504 in communication with the processor, baseband processor 1506, and baseband processor memory 1508 in communication with the baseband processor. Mesh network node 1500 may also include first radio transceiver 1512 and second radio transceiver 1514, internal universal serial bus (USB) port 1516, and subscriber information module card (SIM card) 1518 coupled to USB port 1516. In some embodiments, the second radio transceiver 1514 itself may be coupled to USB port 1516, and communications from the baseband processor may be passed through USB port 1516. The second radio transceiver may be used for wirelessly backhauling eNodeB 1500.

Processor 1502 and baseband processor 1506 are in communication with one another. Processor 1502 may perform routing functions, and may determine if/when a switch in network configuration is needed. Baseband processor 1506 may generate and receive radio signals for both radio transceivers 1512 and 1514, based on instructions from processor 1502. In some embodiments, processors 1502 and 1506 may be on the same physical logic board. In other embodiments, they may be on separate logic boards.

Processor 1502 may identify the appropriate network configuration, and may perform routing of packets from one network interface to another accordingly. Processor 1502 may use memory 1504, in particular to store a routing table to be used for routing packets. Baseband processor 1506 may perform operations to generate the radio frequency signals for transmission or retransmission by both transceivers 1510 and 1512. Baseband processor 1506 may also perform operations to decode signals received by transceivers 1512 and 1514. Baseband processor 1506 may use memory 1508 to perform these tasks.

The first radio transceiver 1512 may be a radio transceiver capable of providing LTE eNodeB functionality, and may be capable of higher power and multi-channel OFDMA. The second radio transceiver 1514 may be a radio transceiver capable of providing LTE UE functionality. Both transceivers 1512 and 1514 may be capable of receiving and transmitting on one or more LTE bands. In some embodiments, either or both of transceivers 1512 and 1514 may be capable of providing both LTE eNodeB and LTE UE functionality. Transceiver 1512 may be coupled to processor 1502 via a Peripheral Component Interconnect-Express (PCI-E) bus, and/or via a daughtercard. As transceiver 1514 is for providing LTE UE functionality, in effect emulating a user equipment, it may be connected via the same or different PCI-E bus, or by a USB bus, and may also be coupled to SIM card 1518. First transceiver 1512 may be coupled to first radio frequency (RF) chain (filter, amplifier, antenna) 1522, and second transceiver 1514 may be coupled to second RF chain (filter, amplifier, antenna) 1524.

SIM card 1518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1500 is not an ordinary UE but instead is a special UE for providing backhaul to device 1500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1512 and 1514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1502 for reconfiguration.

A GPS module 1530 may also be included, and may be in communication with a GPS antenna 1532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1532 may also be present and may run on processor 1502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 16:
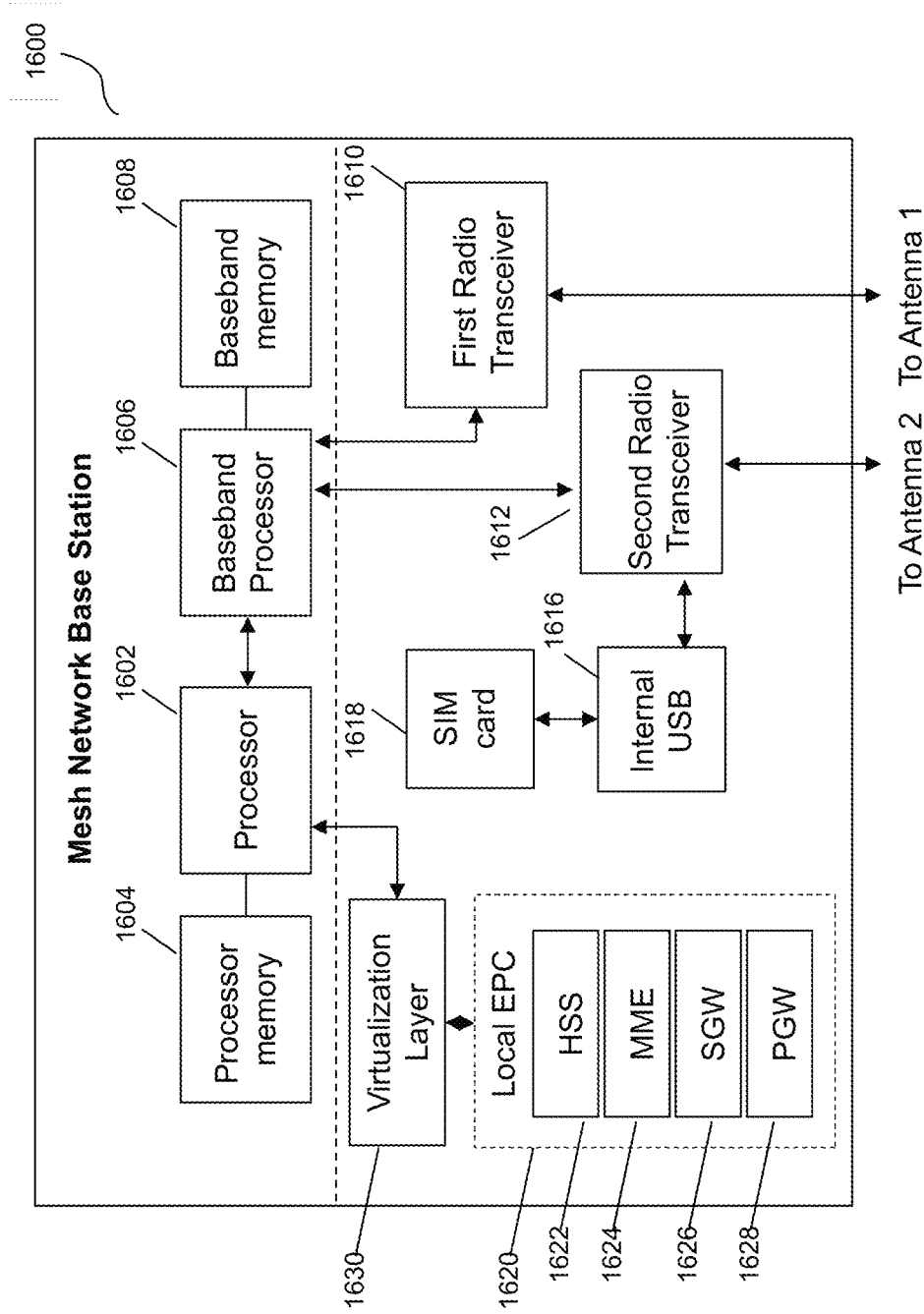
FIG. 16 is a diagram showing an exemplary coordinating server, in accordance with some embodiments.

FIG. 16 is mesh network base station 1600 or performing the methods described herein, in accordance with some embodiments. Mesh network node 1600 may include processor 1602, processor memory 1604 in communication with the processor, baseband processor 1606, and baseband processor memory 1608 in communication with the baseband processor. Mesh network node 1600 may also include first radio transceiver 1612 and second radio transceiver 1614, internal universal serial bus (USB) port 1616, and subscriber information module card (SIM card) 1618 coupled to USB port 1616. In some embodiments, the second radio transceiver 1614 itself may be coupled to USB port 1616, and communications from the baseband processor may be passed through USB port 1616. The second radio transceiver may be used for wirelessly backhauling eNodeB 1600.

Processor 1602 and baseband processor 1606 are in communication with one another. Processor 1602 may perform routing functions, and may determine if/when a switch in network configuration is needed. Baseband processor 1606 may generate and receive radio signals for both radio transceivers 1612 and 1614, based on instructions from processor 1602. In some embodiments, processors 1602 and 1606 may be on the same physical logic board. In other embodiments, they may be on separate logic boards.

Processor 1602 may identify the appropriate network configuration, and may perform routing of packets from one network interface to another accordingly. Processor 1602 may use memory 1604, in particular to store a routing table to be used for routing packets. Baseband processor 1606 may perform operations to generate the radio frequency signals for transmission or retransmission by both transceivers 1610 and 1612. Baseband processor 1606 may also perform operations to decode signals received by transceivers 1612 and 1614. Baseband processor 1606 may use memory 1608 to perform these tasks.

The first radio transceiver 1612 may be a radio transceiver capable of providing LTE eNodeB functionality, and may be capable of higher power and multi-channel OFDMA. The second radio transceiver 1614 may be a radio transceiver capable of providing LTE UE functionality. Both transceivers 1612 and 1614 may be capable of receiving and transmitting on one or more LTE bands. In some embodiments, either or both of transceivers 1612 and 1614 may be capable of providing both LTE eNodeB and LTE UE functionality. Transceiver 1612 may be coupled to processor 1602 via a Peripheral Component Interconnect-Express (PCI-E) bus, and/or via a daughtercard. As transceiver 1614 is for providing LTE UE functionality, in effect emulating a user equipment, it may be connected via the same or different PCI-E bus, or by a USB bus, and may also be coupled to SIM card 1618.

SIM card 1618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1600 is not an ordinary UE but instead is a special UE for providing backhaul to device 1600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1612 and 1614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1602 for reconfiguration.

Also shown is virtualization layer 1630 in communication with processor 1602 and also in communication with local EPC 1620. Local EPC 1620 includes HSS 1623, MME 1624, SGW 1626 and PGW 1628.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, 802.11n or 5G NR could be supported, as well as any other OFDM radio standard.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing an energy efficient base station with synchronization, comprising:
performing traffic analysis based on user traffic and signaling traffic at the energy efficient base station to determine off-peak hours duration when traffic is light at the energy efficient base station;
updating downlink and uplink schedulers at the energy efficient base station to transmit, at the energy efficient base station, a minimum required signaling and control information; and
wherein updating downlink and uplink scheduler for minimum required signaling and control information further comprises scheduling, in a downlink direction, at least one of transmitting only limited reference symbols over selected orthogonal frequency division multiplexing (OFDM) symbols, the limited reference symbols and selected OFDM symbols being physical downlink control channel (PDCCH) on up to a first three OFDM symbols, primary synchronization signal (PSS) and secondary synchronization signal (SSS) on a central six physical resource blocks (PRBs), and a physical broadcast channel (PBCH).

2. The method of claim 1, wherein updating downlink and uplink scheduler for minimum required signaling and control information further comprises scheduling, in an uplink direction, transmitting at least one of only PUCCH and PRACH.

3. The method of claim 1, further comprising selecting the selected OFDM symbols based on measured past power efficiency.

4. The method of claim 1, further comprising selecting the selected OFDM symbols based on the selected OFDM symbols being contiguous with one another.

5. The method of claim 1, further comprising selecting the selected OFDM symbols based on the selected OFDM symbols being at or near a beginning or an end of a subframe.

6. The method of claim 1, further comprising scheduling user data transmissions based on power efficiency.

7. The method of claim 1, further comprising identifying user equipments to handover to a macro base station or neighboring base station.

8. The method of claim 1, further comprising turning off additional antennas, power amplifiers and Multiple In Multiple Out (MIMO) antennas.

9. The method of claim 1, wherein performing traffic analysis to determine off-peak hours duration when traffic is light further comprises using self-organizing network (SON) for analysis of user activity and based on the analysis determining at least one of a time of day and a day of the week when a number of users are below a pre-defined threshold.

10. The method of claim 1, further comprising increasing energy efficiency by increasing a linearity of a power amplifier.

11. The method of claim 10, wherein increasing a linearity of a power amplifier includes at least one of using feed forward, pre-distortion, Cartesian feedback, digital pre-distortion, Doherty power amplifier and crest factor reduction.

12. A non-transitory computer-readable medium containing instructions for providing an energy efficient base station with synchronization which, when executed, cause a node to perform steps comprising:
performing traffic analysis based on user traffic and signaling traffic at the energy efficient base station to determine off-peak hours duration when traffic is light at the energy efficient base station;
updating downlink and uplink schedulers at the energy efficient base station to transmit, at the energy efficient base station, a minimum required signaling and control information; and
wherein updating downlink and uplink scheduler for minimum required signaling and control information further comprises scheduling, in a downlink direction, at least one of transmitting only limited reference symbols over selected orthogonal frequency division multiplexing (OFDM) symbols, the limited reference symbols and selected OFDM symbols being physical downlink control channel (PDCCH) on up to a first three OFDM symbols, primary synchronization signal (PSS) and secondary synchronization signal (SSS) on a central six physical resource blocks (PRBs), and a physical broadcast channel (PBCH).

13. The non-transitory computer-readable medium of claim 12 further including instructions wherein updating downlink and uplink scheduler for minimum required signaling and control information further comprises scheduling, in an uplink direction, transmitting at least one of only PUCCH and PRACH.

14. The non-transitory computer-readable medium of claim 12 further including instructions for selecting the selected OFDM symbols based on measured past power efficiency.

15. The non-transitory computer-readable medium of claim 12 further including instructions for selecting the selected OFDM symbols based on the selected OFDM symbols being contiguous with one another.

16. The non-transitory computer-readable medium of claim 12 further including instructions for selecting the selected OFDM symbols based on the selected OFDM symbols being at or near a beginning or an end of a subframe.

17. The non-transitory computer-readable medium of claim 12 further including instructions for scheduling user data transmissions based on power efficiency.

18. The non-transitory computer-readable medium of claim 12 further comprising instructions wherein performing traffic analysis to determine off-peak hours duration when traffic is light further comprises using self-organizing network (SON) for analysis of user activity and based on the analysis determining at least one of a time of day and a day of the week when a number of users are below a pre-defined threshold.

19. A system for providing an energy efficient base station with synchronization, comprising:
at least one node in a core network or in a radio access network, receiving usage information from the energy efficient base station and configured to perform traffic analysis based on user traffic and signaling traffic at the energy efficient base station to determine off-peak hours duration when traffic is light at the energy efficient base station,
and to update downlink and uplink schedulers to transmit a minimum required signaling and control information; and
wherein the downlink and uplink scheduler are updated for minimum required signaling and control information, including scheduling, in a downlink direction, at least one of transmitting only limited reference symbols over selected orthogonal frequency division multiplexing (OFDM) symbols, the limited reference symbols and selected OFDM symbols being physical downlink control channel (PDCCH) on up to a first three OFDM symbols, primary synchronization signal (PSS) and secondary synchronization signal (SSS) on a central six physical resource blocks (PRBs), and a physical broadcast channel (PBCH).

20. The system of claim 19 wherein updating downlink and uplink scheduler for minimum required signaling and control information further comprises scheduling, in an uplink direction, transmitting at least one of only PUCCH and PRACH.

* * * * *